No. 687,005.  
Patented Nov. 19, 1901.
C. F. DARNELL & J. R. DUNCAN.
RUBBER TIRE SETTING MACHINE.
(Application filed Sept. 28, 1900.)
(No Model.)
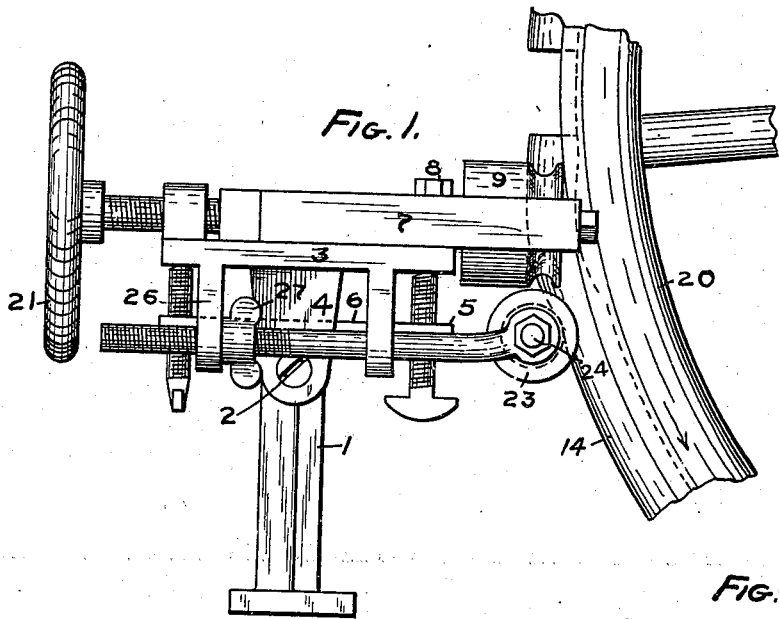
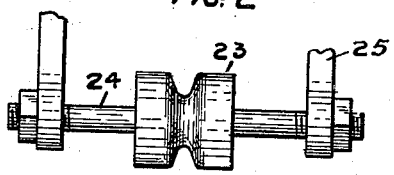
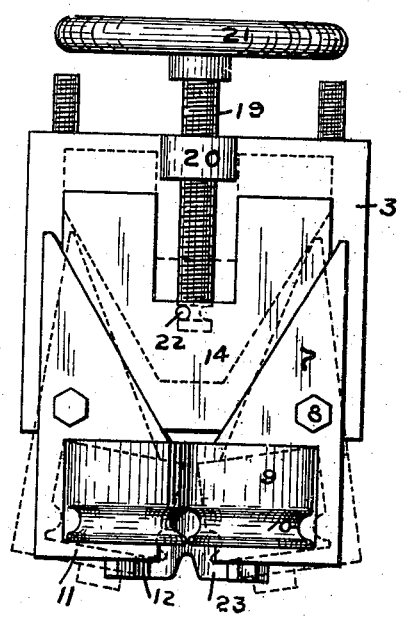
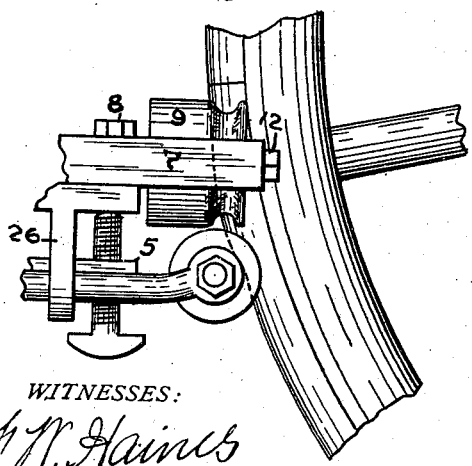
WITNESSES:  
INVENTORS  
Calvin F. Darnell and  
BY John R. Duncan,  
V. H. Lockwood  
their ATTORNEY.

UNITED STATES PATENT OFFICE.

CALVIN F. DARNELL AND JOHN R. DUNCAN, OF INDIANAPOLIS, INDIANA, ASSIGNORS, BY DIRECT AND MESNE ASSIGNMENTS, TO VEHICLE RUBBER TIRE MACHINE COMPANY, OF INDIANAPOLIS, INDIANA.

RUBBER-TIRE-SETTING MACHINE.

SPECIFICATION forming part of Letters Patent No. 687,005, dated November 19, 1901.

Application filed September 28, 1900. Serial No. 31,395. (No model.)

*To all whom it may concern:*

Be it known that we, CALVIN F. DARNELL and JOHN R. DUNCAN, of Indianapolis, county of Marion, and State of Indiana, have invented a certain new and useful Rubber-Tire-Setting Machine; and we do hereby declare that the following is a full, clear, and exact description thereof, reference being had to the accompanying drawings, in which like letters refer to like parts.

The object of this invention is to provide a rubber-tire-setting means for drawing the ends of rubber tires together after they have been placed on the wheel and the ends of the band secured together.

In practice a rubber tire having a band longitudinally through it is placed on the channel-iron of a vehicle-wheel and after the ends of the band are drawn tightly together they are welded. During the welding the ends of the rubber tire are separated a few inches. After the welding the ends of the rubber tire must be drawn together and preferably cemented after being brought together.

The means employed by us to accomplish this object consists of a pair of roller-clamps, whereby the rubber is grasped and then the vehicle is turned slightly until the end of the rubber tire has been moved to its desired position. These clamping-rollers tend to pull the rubber tire out of the channel-iron wheel in operation. One feature of this invention, therefore, is the addition of a roller with a groove in it like a sheave-pulley so placed near the other rollers as to press the rubber back into the channel-iron and keep it from being drawn out too far.

Another feature of the invention consists in the means employed for clamping the pair of rollers together.

The full nature of our invention will be understood from the accompanying drawings and the description following of one form of device embodying our said invention, and the scope of said invention will be understood from the claims following said description.

In the drawings, Figure 1 is a side elevation of our rubber-stretching device, showing its application to a wheel, a portion of which latter is shown. Fig. 2 is a plan of the roller that presses the rubber tire into the channel-iron and means for mounting it, parts being broken away. Fig. 3 shows a portion of the parts in side elevation at the end of the process of bringing the ends of the rubber tire together. Fig. 4 is a plan of the device, showing the different positions of the parts in dotted lines.

Referring now to the details of construction of the device herein shown for the purpose of illustrating the general nature of our invention, 1 is a standard or metal post that is in use mounted on some suitable frame or support. At the upper end a bolt or pivot-pin 2 is mounted, which carries the horizontal plate 3 by means of two depending ears 4. This enables the plate 3 to be tilted, and the tilting is effected by the screw-bolts 5, that extend through threaded apertures in the head 6 of the post 1. This head 6 consists of two horizontal extensions, one on each side at the upper end of said post. The upper end of the bolt 5 merely engages or contacts with the lower surface of the plate 3. By unscrewing one bolt and screwing the other up the tilting is not only effected, but the plate is held rigidly in the changed position. On this plate 3, as appears in Fig. 4, there are two triangular blocks 7, pivoted by the bolts 8 opposite each other and near the two corners of one end of said plate 3. The outside edges of these triangular blocks are usually parallel with each other. The inside edges of said blocks are inclined, as shown, so as to leave a V-shaped opening between them. They do not touch each other and on their outer ends carry the rollers 9, which have near their outer edges the annular groove 10. Said blocks 7 are recessed to receive the rollers 9, so that on the front face of said block there is what may be called an "arm" 11, and through this arm 11 an arbor or bolt 12 extends into the body of the block 7. The rollers are mounted on the arbor or bolt 12. Said rollers are provided with the groove 10 near their front surface for the purpose of forming the annular projection or lip 13, adapted to grasp the rubber tire 14 when it comes between the rollers, as shown in Figs. 1 and 3. Said rollers are brought together into clamping position by the movement of the wedge-shaped block 14, which rests on the plate 3, into the V-shaped opening between the blocks 7, whereby their inner ends are pushed apart and their front ends brought together. The wedge-shaped block 14 is actuated by the screw 19, operating through a threaded opening in the extension 20 on the plate 3 and having the hand-wheel 21 at the rear end. The inner end of the screw 19 rotates in a suitable socket or hole (not shown) in the block 14 and is held from escape by the pin 22. This method of construction is familiar to all and will be understood without further explanation or illustration.

The pressing-in roller 23 is mounted on the transverse arbor 24, that is carried by a pair of rods or arms 25, each supported by the downwardly-projecting ears 26 from each side of the plate 3. Said rods 25 are threaded and carry a nut 26, whereby they may be moved transversely in order to adjust the position of the roller 23 with relation to the other rollers and the tire.

In use the plate 3 is so placed or tilted that its plane will be below the center of the vehicle-wheel 30, substantially as shown in Fig. 1. Assuming the clamping-rollers to be apart, the wheel is so placed that the tire will extend between said rollers, with the cut end about one foot above. Then the hand-wheel 21 is operated, forcing the wedge-shaped block 14 against the rear ends of the blocks 7 to bring the clamping-rollers 9 together to clamp and grasp the rubber tire rather tightly. When this is done, the rubber tire will press rather hard against the holding-in roller 23. Then in the operation the vehicle-wheel is moved in the direction of the arrow, whereby the rubber tire is drawn longitudinally through the clamping-rollers, and said rollers operate to stretch or pull the rubber tire longitudinally toward the other end of the tire until the two ends are brought together, as shown in Fig. 3, when they are cemented or otherwise secured. While this operation is taking place, the tendency of the clamping-rollers 9 is to pull the rubber tire out of the channel-iron; but this is counteracted by the roller 23, which tends to push the rubber tire back into the channel-iron and hold it there and to crowd the tire longitudinally toward the cut end of it to bring the ends together.

What we claim as our invention, and desire to secure by Letters Patent, is—

1. In a rubber-tire-setting machine, a pair of oppositely-pivoted blocks with oppositely-inclined faces at one end, oppositely-located clamping-rollers mounted on the other end of said blocks, a movable wedge-shaped block between the inclined faces of said roller-carrying blocks, and means for actuating said wedge-shaped block.

2. In a rubber-tire-setting machine, a plate, a pair of blocks pivotally mounted on said plate opposite each other with oppositely-inclined faces at one end to leave a wedge-shaped opening between them, clamping-rollers mounted on the other end of said blocks, a wedge-shaped block movable on said plate in the V-shaped opening between said roller-carrying blocks, and a screw for moving said wedge-shaped blocks between said roller-carrying blocks.

3. In a rubber-tire-setting machine, a pair of rollers for clamping the rubber tire on a wheel, means for carrying said rollers, and means for tilting or moving said rollers in a line in the plane of the wheel and tangential to the periphery thereof, whereby the angle of the axis of the rollers to such periphery will be varied.

4. In a rubber-tire-setting machine, a post or support, a plate pivotally mounted thereon in the plane of the vehicle-wheel when mounted in said machine for tire-setting, a pair of clamping-rollers carried on the end of said plate adjacent the wheel for clamping the rubber tire thereon, and means for tilting said plate on said post or support and holding it in the altered position.

5. In a rubber-tire-setting machine, a pair of rollers for clamping the rubber tire, and a grooved roller mounted at a right angle to the other rollers and on a line between them for holding the rubber tire in the channel-iron.

6. In a rubber-tire-setting machine, a pair of rollers for clamping the rubber tire, means for carrying said rollers, a grooved roller mounted at a right angle to the other rollers and on a line between them, and means for carrying said roller that is secured to the means for carrying the other rollers.

7. In a rubber-tire-setting machine, a pair of rollers for clamping the rubber tire, means for carrying said rollers, a grooved roller mounted at a right angle to the other rollers and on a line between them, means for carrying said roller, and means for adjusting the position of said roller with relation to the clamping-rollers.

8. In a rubber-tire-setting machine, a post, a plate pivotally mounted on said post, means for tilting said plate and holding it in its tilted position, a pair of rollers carried by said plate for clamping the rubber tire, extensions from said plate, a grooved roller mounted at a right angle to the other rollers and on a line between them, means for carrying said roller that extends through said extensions, and means for adjusting the position.

In witness whereof we have hereunto affixed our signatures in the presence of the witnesses herein named.

CALVIN F. DARNELL.
JOHN R. DUNCAN.

Witnesses:
M. C. BUCK,
V. H. LOCKWOOD.